United States Patent [19]
Acoraci et al.

[11] Patent Number: 5,955,990
[45] Date of Patent: Sep. 21, 1999

[54] LINEAR INTERFEROMETER ANTENNA CAPABLE OF MAKING ERROR-FREE AZIMUTH AND ELEVATION ANGLE MEASUREMENTS

[75] Inventors: Joseph H. Acoraci, Phoenix; George M. Miller, Parkton, both of Md.

[73] Assignee: Raytheon Company, Lexington, Mass.

[21] Appl. No.: 08/991,458

[22] Filed: Dec. 16, 1997

[51] Int. Cl.$^6$ ........................................... H01Q 3/26
[52] U.S. Cl. ..................... 342/373; 342/156; 342/424
[58] Field of Search ..................... 342/156, 373, 342/424, 437, 434

[56] References Cited

U.S. PATENT DOCUMENTS

| | | | |
|---|---|---|---|
| 3,812,493 | 5/1974 | Afendykiw | 343/12 R |
| 3,943,514 | 3/1976 | Afendykiw | 343/16 R |
| 3,979,754 | 9/1976 | Archer | 343/754 |
| 4,316,192 | 2/1982 | Acoraci | 343/100 SA |
| 4,342,997 | 8/1982 | Evans | 343/16 R |
| 4,639,732 | 1/1987 | Acoraci et al. | 342/371 |
| 5,218,361 | 6/1993 | Avila | 342/430 |
| 5,351,053 | 9/1994 | Wicks et al. | 342/158 |
| 5,457,466 | 10/1995 | Rose | 342/442 |
| 5,510,796 | 4/1996 | Applebaum | 342/162 |

OTHER PUBLICATIONS

J. Acoraci, R. Leutyler, and J. Livorno, "Bendix IFF Interrogator With Electronic Scan Antenna" pp. 1–11.

*Primary Examiner*—Thomas Tarcza
*Assistant Examiner*—Dao L. Phan
*Attorney, Agent, or Firm*—Daly, Crowley & Mofford, LLP; Judith C. Crowley

[57] ABSTRACT

A linear interferometer antenna for making azimuth angle measurements and elevation angle measurements of an identified target. The antenna includes six radiating elements which receive signals sent from the target, a beam forming network, and a processing unit. Four of the six radiating elements are positioned on a first plane and the remaining two radiating elements are positioned on a second plane. The second plane is parallel to and positioned at a predetermined distance from the first plane.

20 Claims, 7 Drawing Sheets

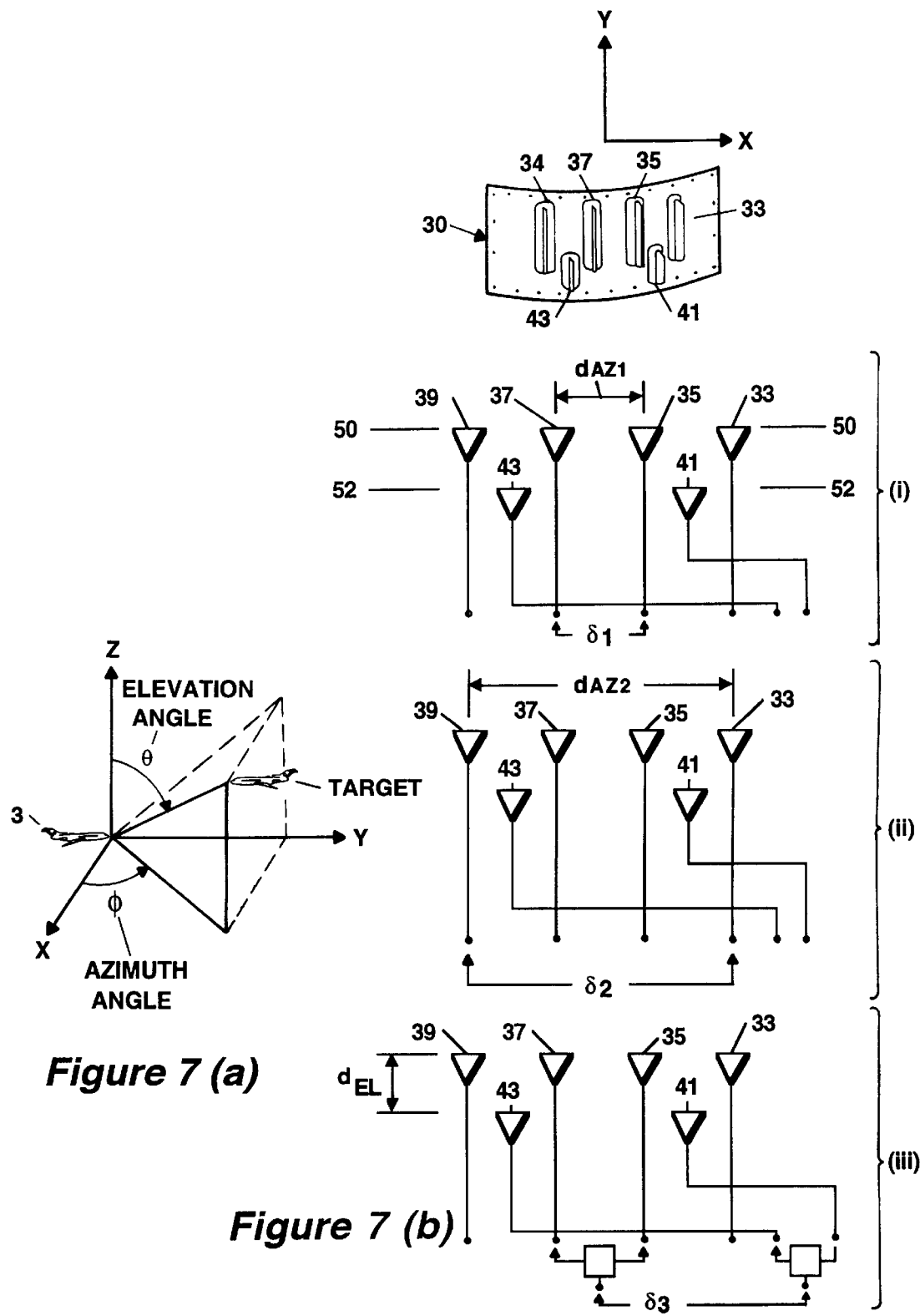

LINEAR INTERFEROMETER ANTENNA CAPABLE OF MAKING ERROR-FREE AZIMUTH AND ELEVATION ANGLE MEASUREMENTS

BACKGROUND OF THE INVENTION

A) Field of Invention

The present invention relates to a linear interferometer antenna, and more particularly to a linear interferometer antenna which is capable of making error-free azimuth and elevation angle measurements.

B) Description of Related Art

FIG. 1 shows a conventional 4-blade linear interferometer antenna 1. The antenna I is typically positioned on the fuselage of a plane 3 to determine the azimuth angle of a target. As shown in FIG. 2, the antenna 1 includes four radiating elements 5, 7, 9 and 11, a Beam Forming Network (BFN) 13, and a Processing Unit (PU) 20.

The BFN 13 includes a complex set of hardware which includes, among other things, switch networks 6 and 12, phase shifters 8, a power divider 10, and digital circuitry 14. The BFN 13 processes, and routes a sum beam pattern 15 and a difference beam pattern 17 to the radiating elements 5, 7, 9 and 11. The sum and difference beam patterns 15 and 17 are produced at numerous different locations to perform an Identification-Friend-or-Foe (IFF) interrogation of targets. When a target is in the path of a given set of the beam patterns 15 and 17, the target will reply with a sequence of pulses which identify the target.

The use of sum and difference beam patterns to perform an IFF communication with a target is well known in the art and is described, for example, in U.S. Pat. No. 4,316,192. This document is hereby incorporated by reference as if set forth fully herein.

Each of the radiating elements 5, 7, 9, and 11 also receive an RF signal which is sent from a transponder located in the target aircraft. These four signals, which are shown as RF1–RF4 in FIG. 2, each have a known frequency, amplitude, and phase. The signals RF1–RF4 are forwarded to the PU 20 via an outputs 19A and 19B.

The PU 20 contains various types of hardware components. In particular, the PU 20 contains log receivers, amplitude limiters, amplitude comparators, A/D convertors, and various digital processors. Each of these devices are used, as is known in the art, to control the BFN 13 and to process the received signals RF1–RF4.

FIG. 3(a) shows a coordinate system which used by the antenna 1 to identify the target. The coordinate system defines a target elevation angle $\theta$ and a target azimuth angle $\phi$. Both the target elevation angle $\theta$ and the target azimuth angle $\phi$ are defined relative to the antenna 1 which is placed on the plane 3.

FIG. 3(b) represents the mechanical and electrical configuration of the antenna 1. Referring to FIG. 3(b), $d_{AZ1}$ refers to the mechanical spacing between radiating elements 7 and 9, $\delta 1$ refers to the electrical phase difference between radiating elements 7 and 9, $d_{AZ2}$ refers to the mechanical spacing between radiating elements 5 and 11, and $\delta 2$ refers to the electrical phase difference between radiating elements 5 and 11.

The conventional 4-blade linear interferometer antenna 1 derives the target azimuth angle $\phi$, as is described below, by calculating two estimates. The two estimates are then compared and a final azimuth target angle $\phi$ is derived.

To begin, the antenna 1 calculates a first estimate of the target azimuth angle $\phi 1$. This first estimate of the azimuth target angle $\phi 1$ is based on Equation 1 below.

Equation 1: $\phi 1 = ARCSIN[(\lambda/360)(1/d_{AZ1})(1/SIN\theta 1)(\delta 1)]$ Referring to Equation 1, $\lambda$ defines to the wavelength of the antenna's operating frequency, and $\theta 1$ defines to the elevation angle of the target. Given that the elevation angle of the target $\theta 1$ is not known, the conventional antenna 1 assumes $\theta 1$ to be 90°. As a result, the SIN $\theta 1$, as used in Equation 1, is set equal to 1.

The second estimate of the target azimuth angle $\phi 2$ is similarly calculated. The second estimate $\phi 2$ is calculated based on Equation 2 below.

Equation 2: $\phi 2 = ARCSIN[(\delta/360)(1/d_{AZ2})(1/SIN\theta 2)(\delta 2)]$

Referring to Equation 2, $\lambda$ defines the wavelength of the antenna's operating frequency, and $\theta 2$ defines the elevation angle of the target. Here again, $\theta 2$ is assumed to be 90° and the SIN $\theta 2$ is set equal to 1.

The estimated target azimuth angle $\phi 1$ is based on $d_{AZ1}$ which defines the spacing between the closest radiating elements 7 and 9. Given the short spacing between the elements, as is known in the art, $\phi 1$ does not represent a highly accurate estimate. However, $\phi 1$ does constitute a unique estimate with no mathematical ambiguities.

The estimated target azimuth angle $\phi 2$ is based on $d_{AZ2}$ which defines the spacing between the most distant radiating elements 5 and 11. Given the larger spacing between the elements, as is similarly known in the art, $\phi 2$ represents a more accurate estimate. However, $\phi 2$ is not a unique estimate and results in more than one answer. That is, $\phi 2$ can define both a positive and negative number. This mathematical ambiguity is attributable to the period characteristics of the SIN function used in Equations 1 and 2.

In view of these mathematical ambiguities, the conventional 4-blade linear interferometer antenna 1 compares the estimate of $\phi 1$ with the plurality of estimates calculated for $\phi 2$. The conventional antenna 1 then selects the estimate of $\phi 2$ which most closely matches the estimate of $\phi 1$ as the target azimuth angle.

The conventional 4-blade linear interferometer antenna 1 as described above and shown in FIGS. 1–3 does, however, have certain drawbacks. Most notably, as is shown in FIG. 4, the azimuth angle $\phi$ which is calculated by the antenna 1 contains large errors when the target is positioned at a high elevation angle $\theta$. This error is attributable to what is known in the art as the coning effect. Moreover, the conventional antenna 1 does not calculate the elevation angle $\theta$ but rather assumes that it is equal to 90°.

In view of these drawbacks, there currently exists a need for a linear interferometer antenna which can calculate an azimuth angle $\phi$ with out any errors, irrespective of the elevation angle $\phi$, and which can calculate the elevation angle.

OBJECTS AND SUMMARY OF THE INVENTION

It is accordingly an object of the present invention to provide a linear interferometer antenna which can calculate an azimuth angle $\phi$ without any errors, irrespective of the elevation angle $\theta$.

It is another object of the invention to provide a linear interferometer antenna which can also calculate the elevation angle $\theta$.

In accordance with a first embodiment of the invention, a linear interferometer antenna is disclosed for making azimuth angle measurements and elevation angle measurements of an identified target, where the antenna comprises: six radiating elements which receive signals sent from the target; a beam forming network; and, a processing unit, wherein (i) four of the six radiating elements are positioned on a first plane and the remaining two radiating elements are positioned on a second plane, and, (ii) the second plane is positioned parallel to and at a predetermined distance from the first plane.

In accordance with another aspect of this embodiment of the invention, the beam forming network measures both a first electrical phase difference and a first distance between two radiating elements positioned on the first plane; the beam forming network measures a third electrical phase difference between two of the radiating elements on first plane and two of the radiating elements on the second plane; and, the processor calculates an azimuth angle and elevation angle of the target based on the first electrical phase difference, the third electrical phase difference, the first distance between the two elements positioned on the first plane, and the predetermined distance between the first plane and the second plane.

In accordance with even another aspect of this embodiment of the invention, the processor calculates the azimuth angle for the target using the equation:

$$\phi_{13} = \text{ARCTAN}[(d_{EL}/d_{AZ1})(\delta 1/\delta 3)]$$

where $\phi_{13}$ equals the azimuth angle for the target, $\delta 1$ equals the first electrical phase difference, $\delta 3$ equals the third electrical phase difference, $d_{AZ1}$ equals the first distance between elements positioned on the first plane, and $d_{EL}$ equals the predetermined distance between the first and second plane.

In accordance with yet another aspect of this embodiment of the invention, the processor calculates the elevation angle for the target using the equation:

$$\theta_{13} = \text{ARCSIN}[\delta 1/(360(d_{AZ1}/\lambda)\text{SIN}\phi_{13})]$$

where $\theta_{13}$ equals the elevation angle for the target, and $\lambda$ defines to a wavelength of the antenna's operating frequency.

In accordance with even yet another aspect of this embodiment of the invention, the beam forming network measures both a second electrical phase difference and a second distance between two radiating elements positioned on the first plane; the beam forming network measures a third electrical phase difference between two of the radiating elements on the first plane and two of the radiating elements on the second plane; and, the processor calculates an azimuth angle and elevation angle of the target based on the second electrical phase difference, the third electrical phase difference, the second distance between the two elements positioned on the first plane, and the predetermined distance between the first plane and the second plane.

In accordance with another aspect of this embodiment of the invention, the processor calculates the azimuth angle for the target using the equation:

$$\phi_{23} = \text{ARCTAN}[(d_{EL}/d_{AZ2})(\delta 2/\delta 3)]$$

where $\phi_{23}$ equals the azimuth angle for the target, $\delta 2$ equals the second electrical phase difference, $\delta 3$ equals the third electrical phase difference, $d_{AZ2}$ equals the second distance between elements positioned on the first plane, and $d_{EL}$ equals the predetermined distance between the first and second plane.

In accordance with even another aspect of this embodiment of the invention, the processor calculates the elevation angle for the target using the equation:

$$\theta_{23} = \text{ARCSIN}[\delta 2/(360(d_{AZ2}/\lambda)\text{SIN}\phi_{23})]$$

where $\theta_{23}$ equals the elevation angle for the target, and $\lambda$ defines a wavelength of the antenna's operating frequency.

In accordance with a second embodiment of the invention, a method for calculating an azimuth angle and an elevation angle of a target is disclosed, where the method comprises the steps of: (1) using a linear interferometer antenna comprising six radiating elements which receive signals sent from the target, a beam forming network, and, a processing unit, (2) positioning four of the six radiating elements on a first plane and the remaining two radiating elements on a second plane, (3) positioning the second plane parallel to and at a predetermined distance from the first plane.

In accordance with another aspect of this embodiment of the invention, the method further comprises the steps of: (4) measuring both a first electrical phase difference and a first distance between two radiating elements positioned on the first plane; (5) measuring a third electrical phase difference between two of the radiating elements on the first plane and two of the radiating elements on the second plane; and, (6) calculating an azimuth angle and elevation angle of the target based on the first electrical phase difference, the third electrical phase difference, the first distance between the elements positioned on the first plane, and the predetermined distance between the first plane and the second plane.

In accordance with another aspect of this embodiment of the invention, the method further comprises the step of calculating the azimuth angle for the target using the equation:

$$\phi_{13} = \text{ARCTAN}[(d_{EL}/d_{AZ1})(\delta 1/\delta 3)]$$

where $\phi_{13}$ equals the azimuth angle for the target, $\delta 1$ equals the first electrical phase difference, $\delta 3$ equals the third electrical phase difference, and $d_{AZ1}$ equals the first distance between elements positioned on the first plane, $d_{EL}$ equals the predetermined distance between the first and second plane.

In accordance with another aspect of this embodiment of the invention, the method further comprises the step of calculating the elevation angle for the target using the equation:

$$\theta_{13} = \text{ARCSIN}[\delta 1/(360(d_{AZ1}/\lambda)\text{SIN}\phi_{13})]$$

where $\theta_{13}$ equals the elevation angle for the target, and $\lambda$ defines to a wavelength of the antenna's operating frequency.

In accordance with another aspect of this embodiment of the invention, the method further comprises the steps of: (4) measuring both a second electrical phase difference and a second distance between two radiating elements positioned on the first plane; (5) measuring a third electrical phase difference between two of the radiating elements on the first plane and two of the radiating elements on the second plane; and, (6) calculating an azimuth angle and elevation angle of the target based on the second electrical phase difference, the third electrical phase difference, the second distance between the elements positioned on the first plane, and the predetermined distance between the first plane and the second plane.

In accordance with another aspect of this embodiment of the invention, the method further comprises the step of calculating the azimuth angle for the target using the equation:

$$\phi_{23} = ARCTAN\ [(d_{EL}/d_{AZ2})(\delta 2/\delta 3)]$$

where $\phi_{23}$ equals the azimuth angle for the target, $\delta 2$ equals the second electrical phase difference, $\delta 3$ equals the third electrical phase difference, $d_{AZ2}$ equals the second distance between elements positioned on the first plane, and $d_{EL}$ equals the predetermined distance between the first and second plane.

In accordance with another aspect of this embodiment of the invention, further comprises the step of calculating the elevation angle for the target using the equation:

$$\theta_{23} = ARCSIN[\delta 2/(360(d_{AZ2}/\lambda)SIN\phi_{23})]$$

where $\theta_{23}$ equals the elevation angle for the target, and $\lambda$ defines a wavelength of the antenna's operating frequency.

In accordance with a third embodiment of the invention, a linear interferometer antenna is disclosed comprising: six radiating elements which receive signals sent from a target; a beam forming network; and, a processing unit, wherein the antenna makes both an azimuth angle measurement and elevation angle measurement of an identified target.

BRIEF DESCRIPTION OF THE DRAWINGS

The accompanying drawings are included to provide an understanding of the invention and constitute a part of the specification.

FIG. 7(a) illustrates a coordinate system which is used by the 6-blade linear interferometer antenna developed in accordance with the present invention; and FIG. 7(b) illustrates the mechanical and electrical configuration of the 6-blade linear interferometer antenna developed in accordance with the present invention.

DETAILED DESCRIPTION OF THE INVENTION

Figure 1:
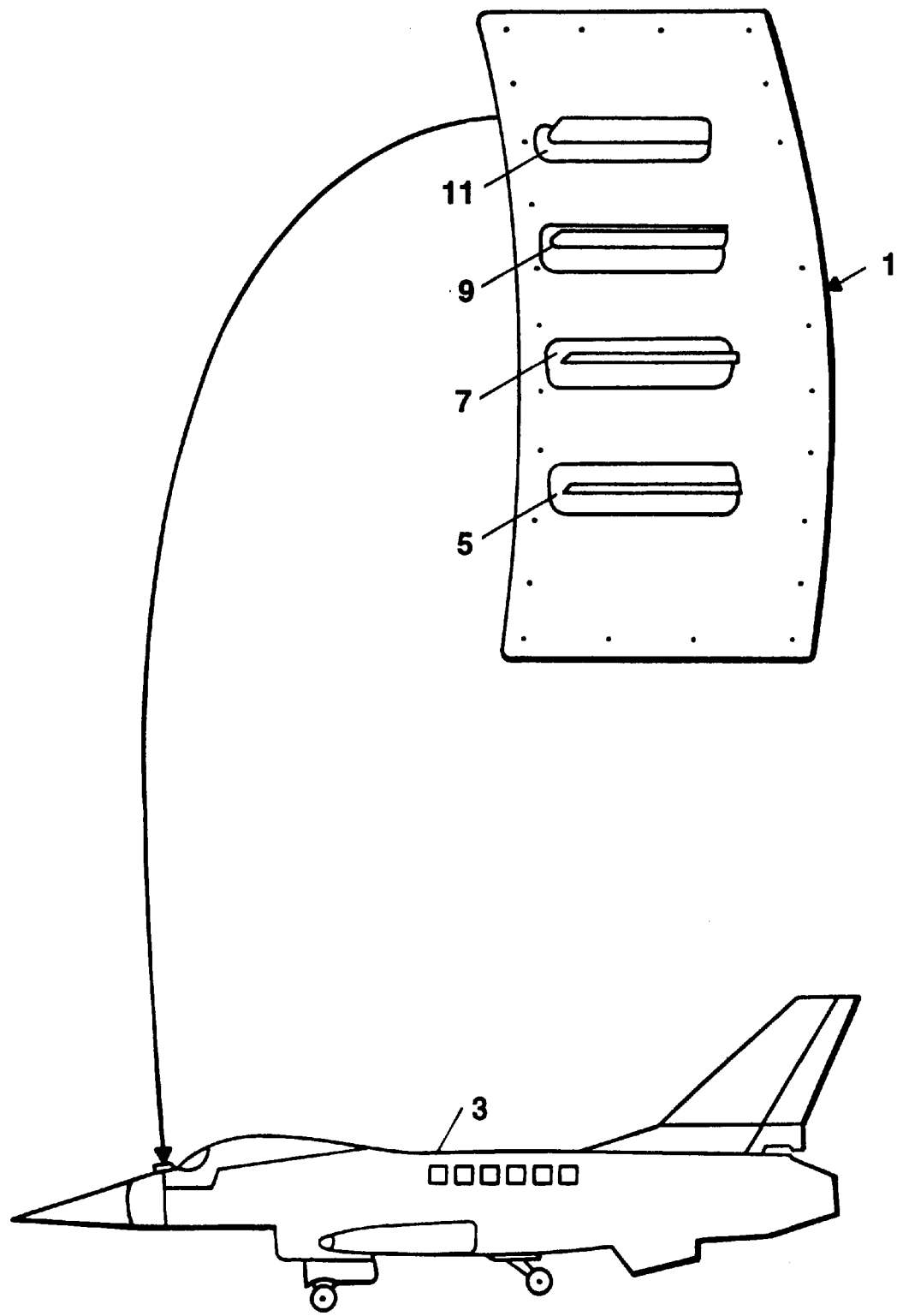
FIG. 1 illustrates a conventional 4-blade linear interferometer antenna.
Figure 2:
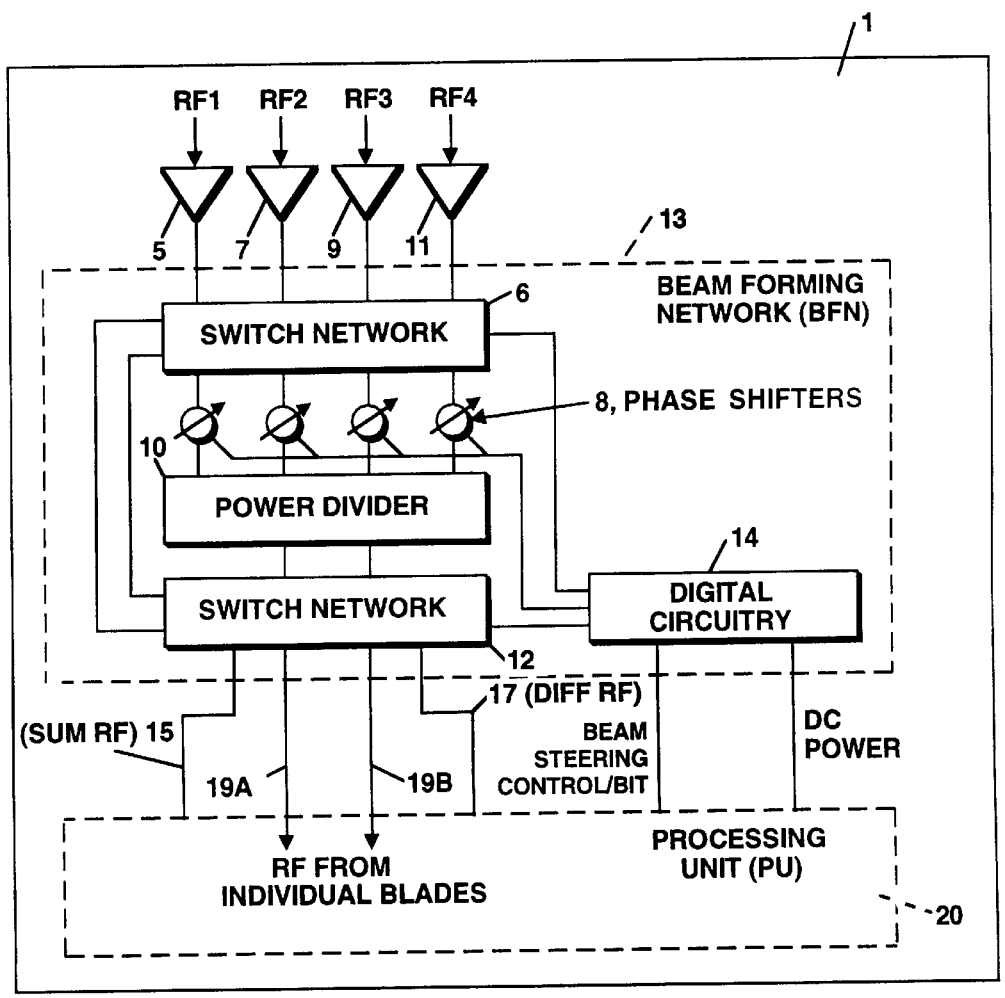
FIG. 2 illustrates a schematic of the conventional 4-blade linear interferometer antenna.
Figure 3B:
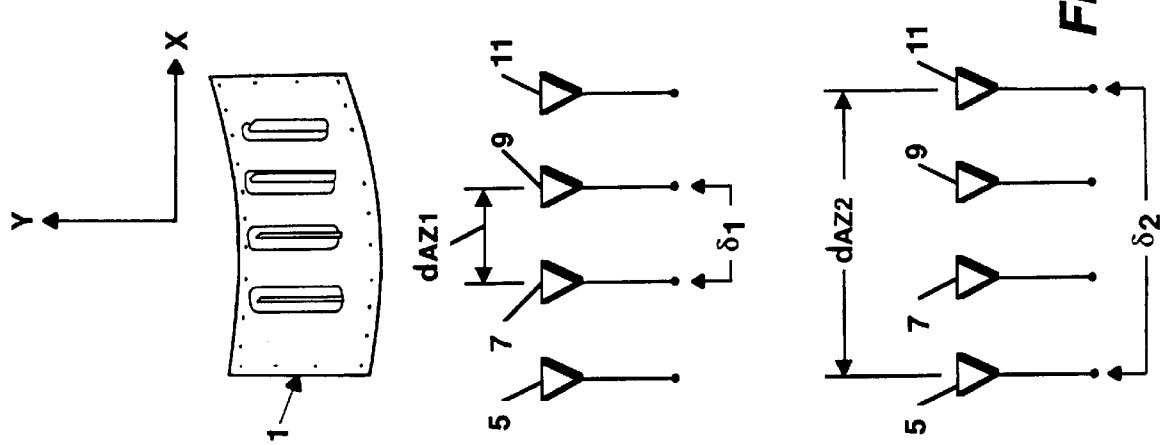
FIG. 3(b) illustrates the mechanical and electrical configuration of the conventional 4-blade linear interferometer antenna.
Figure 3A:
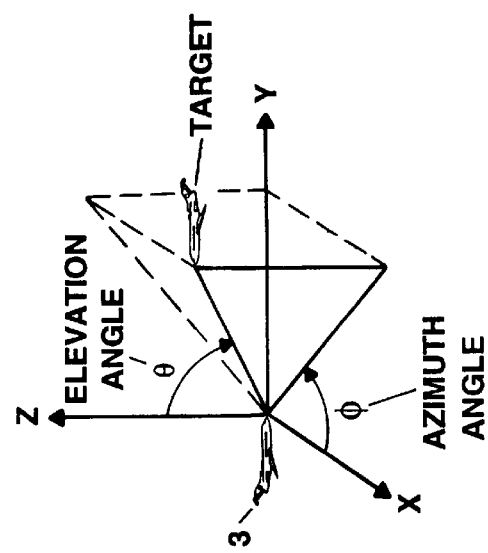
FIG. 3(a) illustrates a coordinate system which is used by the conventional 4-blade linear interferometer antenna to identify a target.
Figure 4:
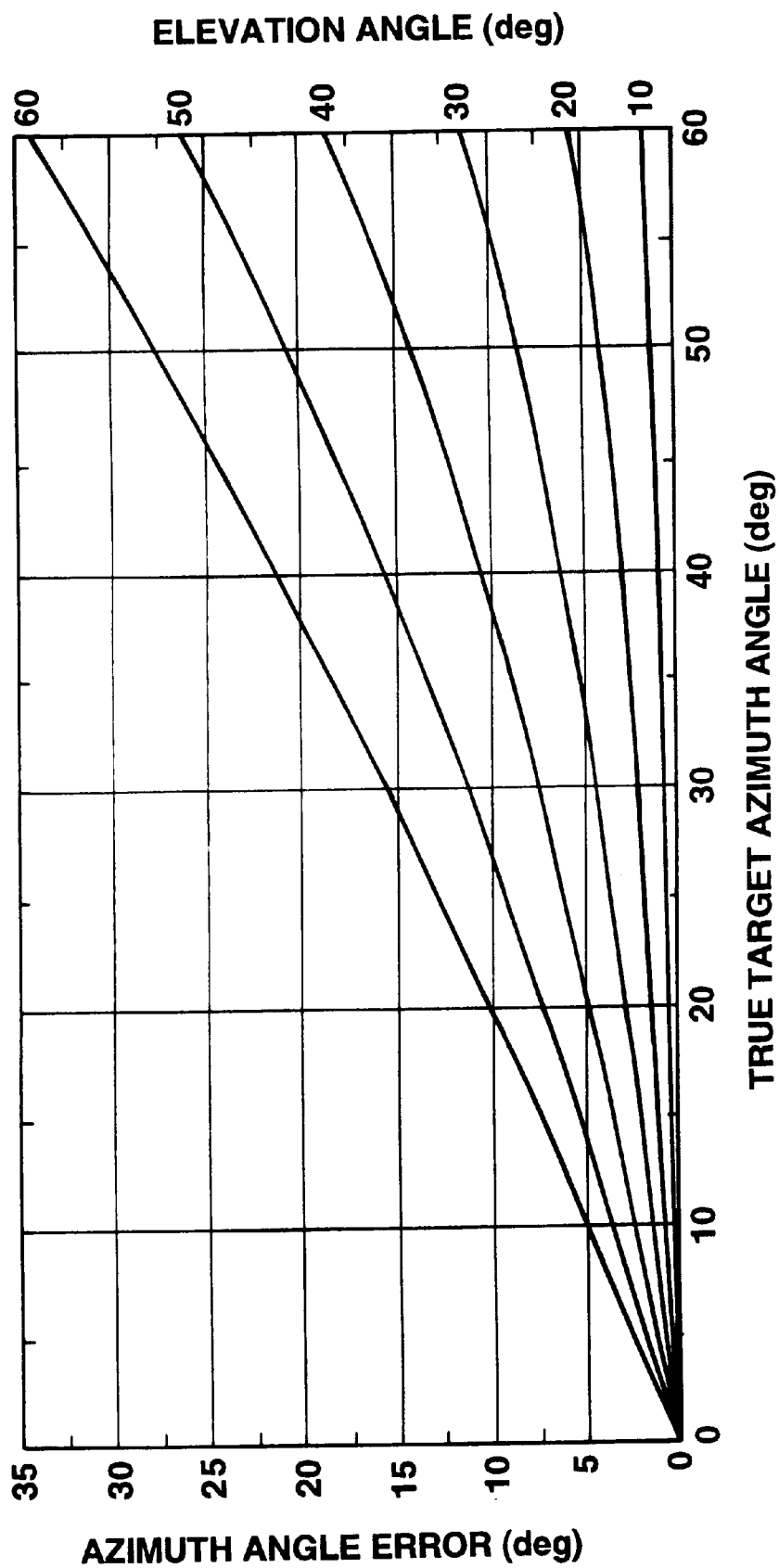
FIG. 4 illustrates errors of the azimuth angle calculated by the conventional 4-blade linear interferometer antenna.
Figure 5:
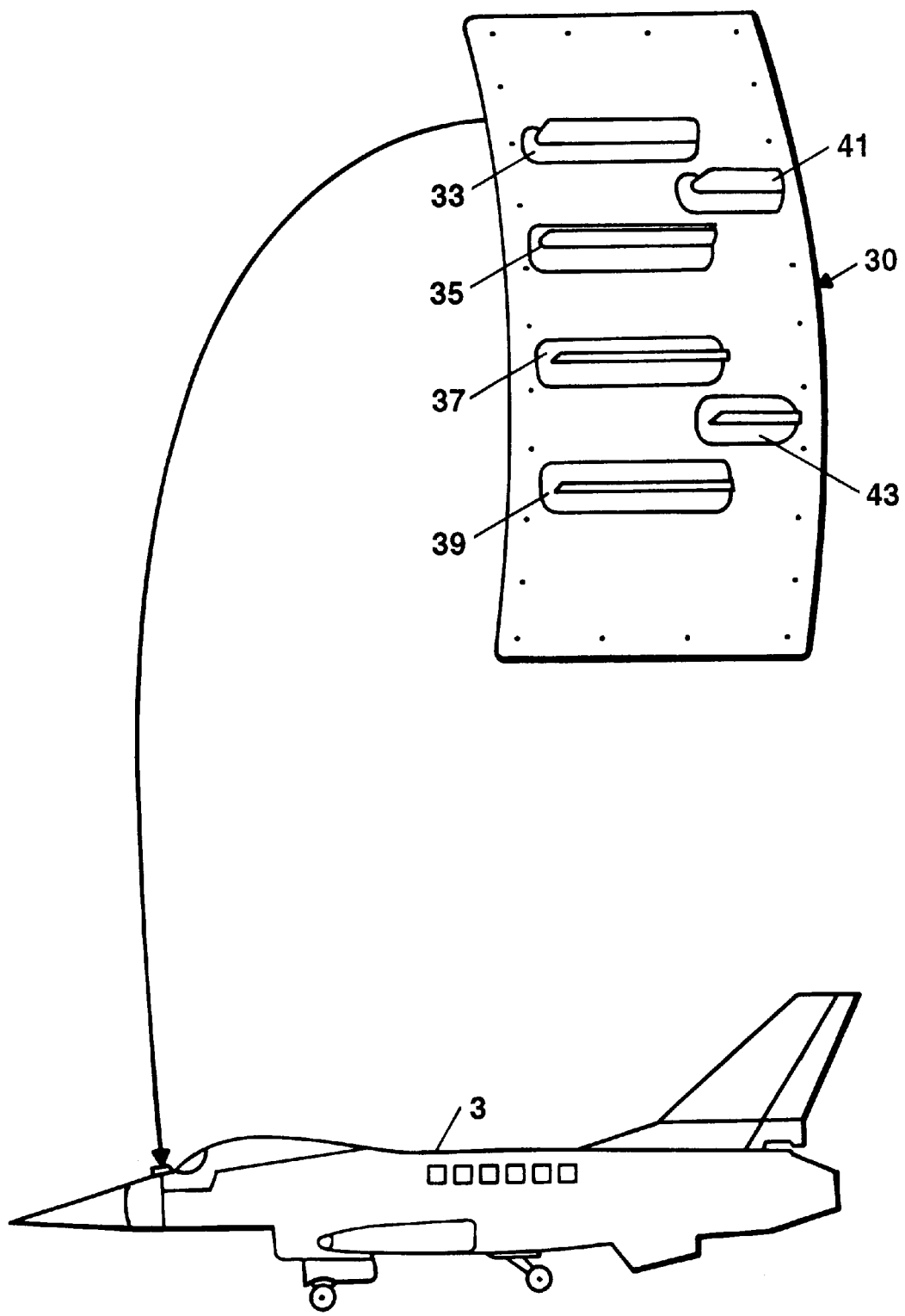
FIG. 5 illustrates a 6-blade linear interferometer antenna developed in accordance with the present invention.
Figure 6:
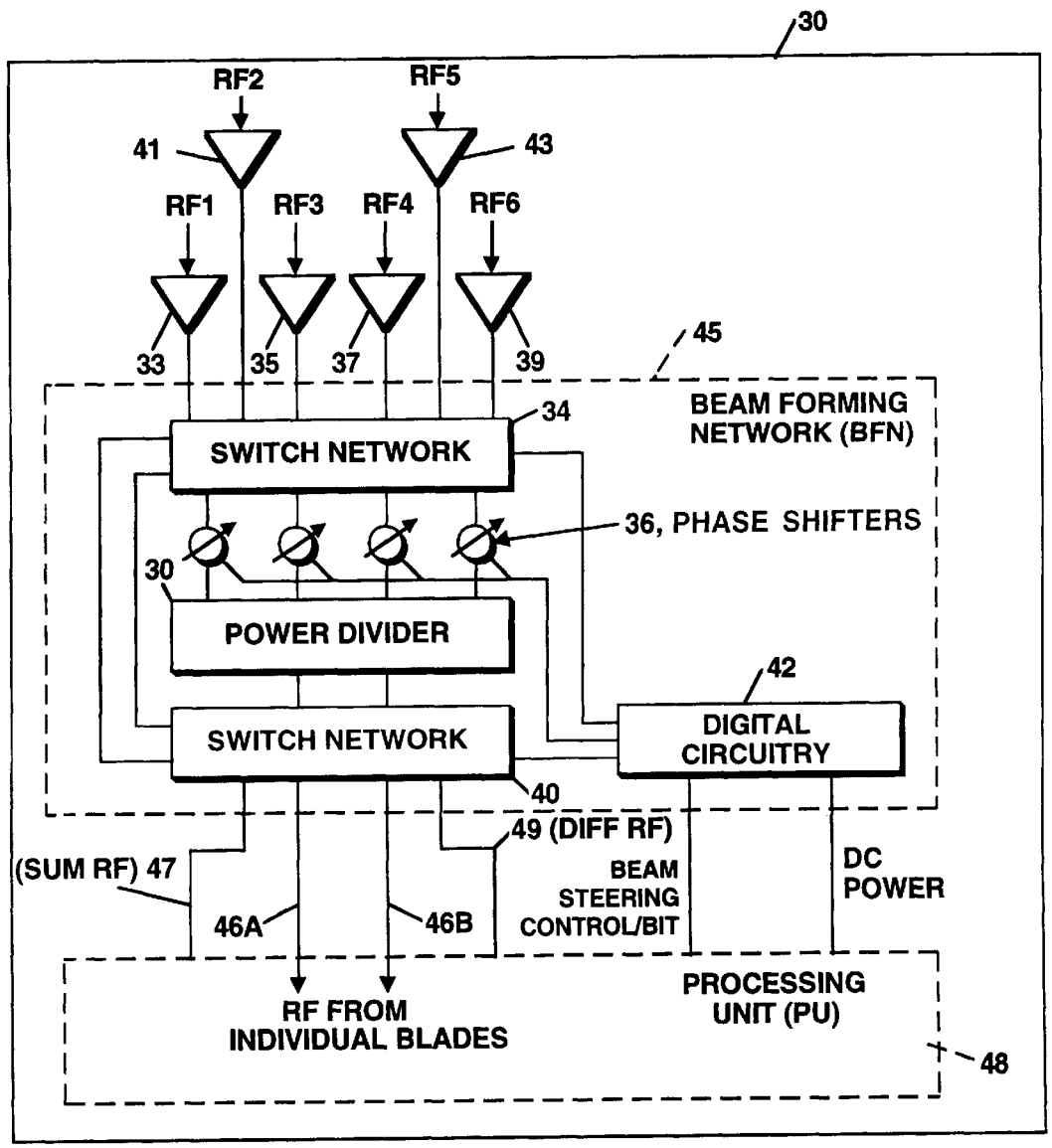
FIG. 6 illustrates a schematic of 6-blade linear interferometer antenna developed in accordance with the present invention.

FIG. 5 shows a 6-blade linear interferometer antenna 30 which was developed in accordance with the present invention. The antenna 30 is positioned on the fuselage of a plane 3 to determine the azimuth angle of a target as well as the elevation angle of the target. As shown in FIG. 6, the antenna 30 includes six radiating elements 33, 35, 37, 39, 41, and 43, a Beam Forming Network (BFN) 45, and a Processing Unit (PU) 48.

The BFN 45 includes a complex set of hardware which includes, among other things, switch networks 34 and 40, phase shifters 36, a power divider 38, and digital circuitry 42. The BFN processes and routes a sum beam pattern 47 and a difference beam pattern 49 to the radiating elements 33, 35, 37, and 39. The sum and difference beam patterns are produced at numerous different locations to perform an Identification-Friend-or-Foe (IFF) interrogation of targets. When a target is in the path of a given set of the beam patterns 47 and 49, the target will reply with a sequence of pulses which identify the target.

Each of the elements 33, 35, 37, 39, 41, and 43 also receive an RF signal which is sent from a transponder located in the target aircraft. These six signals, which are shown as RF1–RF6 in FIG. 5, each have a known frequency, amplitude, and phase. The signals RF1–RF6 are forwarded to the PU 20 via outputs 46A–46B and, as is described below, are used to calculate both the azimuth angle and elevation angle of the target aircraft.

The PU 48 contains various types of hardware. Specifically, the PU 48 contains log receivers, amplitude limiters, amplitude comparators, A/D convertors, and various digital processors. These devices are used to control the BFN 45 and to process signals RF1–RF6 received from the BFN 45.

FIG. 7(a) shows a coordinate system which used by the antenna 30 to identify the target. The coordinate system defines a target elevation angle $\theta$ and a target azimuth angle $\phi$. Both the target elevation angle $\theta$ and the target azimuth angle $\phi$ are defined relative to the antenna 30 which is placed on the plane 3.

FIG. 7(b) represents the mechanical and electrical configuration of the interrogating antenna 30. Referring to FIG. 7(b), $d_{AZ1}$ refers to the mechanical spacing between radiating elements 35 and 37, $\delta 1$ refers to the electrical phase difference between radiating elements 35 and 37, $d_{AZ2}$ refers to the mechanical spacing between radiating elements 33 and 39, $\delta 2$ refers to the electrical phase difference between radiating elements 33 and 39, $d_{EL}$ refers to the mechanical spacing between forward radiating elements 33–39 and aft radiating elements 41 and 43, $\delta 3$ refers to the electrical phase difference between forward radiating elements 35–37 and aft radiating elements 41–43.

The antenna 30 places elements 33, 35, 37, and 39 along a first plane 50. The antenna 30 places the remaining two radiating elements 41 and 43 on a second plane 52. The first plane 50 is positioned directly on the X axis while the second plane 52 is positioned parallel to the first plane 50 and at a predetermined distance from the first plane 50.

The antenna 30, unlike the conventional antenna described above, places the second plane 52, containing the radiating elements 41 and 43, at a predetermined position on the Y axis of the coordinate system. As a result, the PU 48 of the antenna 30 can define and solve a system of equations and, as a result, calculate both the azimuth angle and elevation angle of the target in an error-free manner. A description of the calculations performed by the antenna 30 to achieve this result, as well as the mathematical basis for the calculations, is presented below.

The mathematical expression for the interferometer antenna which measures the electrical phase $\delta 1$, as shown FIG. 7(b)(i), is presented below in Equation 3.

Equation 3: $\delta 1 = 360(d_{AZ1}/\lambda)\text{SIN}\phi\text{SIN}\phi$

Similarly, the mathematical expression for interferometer antenna which measures the electrical phase $\delta 3$, as shown in FIG. 7(b)(iii) is presented below in Equation 4.

Equation 4: $\delta 3 = 360(d_{EL}/\lambda)\text{SIN}(\phi+90)\text{SIN}\theta$

Equation 4 can be further simplified replacing the SIN ($\phi$+90) with the COS$\phi$ as shown below in Equation 5.

Equation 5: $\delta 3 = 360(d_{EL}/\lambda)\text{COS}\phi\text{SIN}\theta$

Equations 3 and 5 are two equations having two unknowns, namely $\phi$ and $\theta$. Thus, these Equations can be solved for $\phi$. In particular, these Equations can be solved for $\phi$ by dividing Equation 3 by Equation 5. When this computation is performed, the result is Equation 6 which is presented below.

Equation 6: $\delta 1/\delta 3 = (d_{AZ1}/d_{EL})(\text{SIN}\phi/\text{COS}\phi)$ When Equation 6 is further simplified, the result is the mathematical expression shown below is Equation 7.

Equation 7: $\delta 1/\delta 3 = (d_{AZ1}/d_{EL})(\text{TAN}\phi)$

This Equation can further be solved for $\phi$ and presented as shown below in Equation 8. In Equation 8, the target azimuth angle is presented as $\phi_{13}$ to designate that is based on measured electrical phase components $\delta 1$ and $\delta 3$ as well as the corresponding physical dimensions of $d_{AZ1}$ and $d_{EL}$.

Equation 8: $\phi_{13} = \text{ARCTAN}[(d_{EL}/d_{AZ1})(\delta 1/\delta 3)]$

Based on Equation 8, $\phi_{13}$ can be calculated given that the variables $d_{EL}$, $d_{AZ1}$, $\delta 1$, and $\delta 3$ are all known. Once this occurs, by using Equation 3 above and the computed value of $\delta_{13}$, the target elevation angle $\theta$ can be calculated. This calculation is performed by representing Equation 3 as Equation 9 shown below.

Equation 9: $\theta_{13} = \text{ARCSIN}[\delta 1/(360(d_{AZ1}/\lambda)\text{SIN}\phi_{13})]$ In Equation 9, the target elevation angle is similarly designated as $\theta_{13}$, given that is based on the computed value of $\phi_{13}$.

The antenna 30 developed in accordance with the present invention also calculates the target azimuth angle based on the electrical phase components $\delta 2$ as measured by schematic (ii) of the interferometer antenna shown in FIG. 7(b), and the electrical phase component $\delta 3$ as measured by schematic (iii) of the interferometer antenna shown in FIG. 7(b). This target angle based on these measured components is similarly designated as $\phi_{23}$ and is represented by Equation 10 below.

Equation 10: $\phi_{23} = \text{ARCTAN}[(d_{EL}/d_{AZ2})(\delta 2/\delta 3)]$

The mathematical derivation for developing Equation 10 is the same as the derivation discussed above for developing Equation 8 except for the fact that variables $\delta 2$ and $d_{AZ2}$ are used in lieu of variables $\delta 1$ and $d_{AZ1}$.

Once the target azimuth angle $\phi 23$ is calculated, the target elevation angle $\theta 23$ can be calculated. This calculation is performed by Equation 11 shown below. Equation 11 is generally the same as Equation 9 except for the fact that variables $\delta 2$, $d_{AZ2}$, and $\phi 23$ are used in lieu of variables $\delta 1$, $d_{AZ1}$, and $\phi_{13}$.

Equation 11: $\theta_{23} = \text{ARCSIN}[\delta 2/(360(d_{AZ2}/\lambda)\text{SIN}\phi_{23})]$ In Equation 11, the target elevation angle is similarly designated as $\theta_{23}$, given that is based on the computed value of $\phi_{23}$.

At this point in the calculation, the antenna 30 has calculated two sets of data points. The first set being $\phi_{13}$ and $\theta_{13}$, and the second set being $\phi_{23}$ and $\theta 23$. It is important to note that $\phi_{23}$ is not a unique estimate and results in more than one answer. This mathematical ambiguity is attributable to the period characteristics of the trigonometric functions used in foregoing Equations. In view of these mathematical ambiguities, the antenna 30 compares the calculated value of $\phi_{13}$ with the plurality of calculated values for $\phi_{23}$ and then selects the value of $\phi_{23}$ which matches the value of $\phi_{13}$ as the target azimuth angle. The corresponding value of $\theta_{23}$ is selected as the target elevation angle.

Each of the calculations described above in Equations 3 through 11, among others, are performed by the PU 48. The results are then forwarded to the cockpit of the plane 3 for evaluation by the pilot or further processing as is necessary.

The target azimuth angles $\phi_{13}$ and $\phi_{23}$ are solutions for the true target azimuth angle $\phi$ and are exact for targets at any elevation angle $\theta$. Thus, unlike conventional linear interferometer antennas, the accuracy of the linear interferometer antenna 30 developed in accordance with the present invention is neither compromised nor degraded by the coning effect. Moreover, the antenna 30 calculates the elevation angle $\theta$ for each target.

The present invention is not to be considered limited in scope by the preferred embodiments described in the specification. Additional advantages and modifications, which will readily occur to those skilled in the art from consideration of the specification and practice of the invention, are intended to be within the scope and spirit of the following claims.

We claim:

1. A linear interferometer antenna for making azimuth angle measurements and elevation angle measurements of an identified target, said antenna comprising:

six radiating elements which receive signals sent from the target;

a beam forming network; and, a processing unit, wherein (i) four of said six radiating elements are positioned on a first plane and the remaining two radiating elements are positioned on a second plane, and, (ii) said second plane is positioned parallel to and at a predetermined distance from said first plane.

2. A linear interferometer antenna according to claim 1, wherein:

said beam forming network measures both a first electrical phase difference and a first distance between two radiating elements positioned on the first plane;

said beam forming network measures a third electrical phase difference between two radiating elements on said first plane and all of said radiating elements on said second plane; and, said processor calculates an azimuth angle and elevation angle of the target based on said first electrical phase difference, said third electrical phase difference, said first distance between said elements positioned on said first plane, and said predetermined distance between said first plane and said second plane.

3. A linear interferometer antenna according to claim 2, wherein:

said processor calculates the azimuth angle for the target using the equation:

$$\phi_{13} = \text{ARCTAN}[(d_{EL}/d_{AZ1})(\delta 1/\delta 3)]$$

where $\phi_{13}$ equals the azimuth angle for the target, $\delta 1$ equals said first electrical phase difference, $\delta 3$ equals said third electrical phase difference, $d_{AZ1}$ equals said first distance between elements positioned on said first plane, and $d_{EL}$ equals said predetermined distance between said first and second plane.

4. A linear interferometer antenna according to claim 3, wherein:

said processor calculates the elevation angle for the target using the equation:

$$\theta_{13} = \text{ARCSIN}[\delta 1/360(d_{AZ1}\lambda)\text{SIN}\phi_{13})]$$

where $\theta_{13}$ equals the elevation angle for the target, and $\lambda$ defines to a wavelength of the antenna's operating frequency.

5. A linear interferometer antenna according to claim 1, wherein:

said beam forming network measures both a second electrical phase difference and a second distance between two radiating elements positioned on the first plane;

said beam forming network measures a third electrical phase difference between two of said radiating elements on said first plane and two of said radiating elements on said second plane; and, said processor calculates an azimuth angle and elevation angle of the target based on said second electrical phase difference, said third electrical phase difference, said second distance between said two elements positioned on said first plane, and said predetermined distance between said first plane and said second plane.

6. A linear interferometer antenna according to claim 5, wherein:

said processor calculates the azimuth angle for the target using the equation:

$$\phi_{23} = \text{ARCTAN}[(d_{EL}/d_{AZ2})(\delta 2/\delta 3)]$$

where $\phi_{23}$ equals the azimuth angle for the target, $\delta 2$ equals said second electrical phase difference, $\delta 3$ equals said third electrical phase difference, $d_{AZ2}$ equals said second distance between elements positioned on said first plane, and $d_{EL}$ equals said predetermined distance between said first and second plane.

7. A linear interferometer antenna according to claim 6, wherein:

said processor calculates the elevation angle for the target using the equation:

$$\theta_{23} = \text{ARCSIN}[\delta 2/(360(d_{AZ2}/\lambda)\text{SIN}\phi_{23})]$$

where $\theta_{23}$ equals the elevation angle for the target, and $\lambda$ defines a wavelength of the antenna's operating frequency.

8. A method for calculating an azimuth angle and an elevation angle of a target, said method comprising the steps of:

(1) using a linear interferometer antenna comprising six radiating elements which receive signals sent from the target, a beam forming network, and, a processing unit, (2) positioning four of said six radiating elements on a first plane and the remaining two radiating elements on a second plane, (3) positioning said second plane parallel to and at a predetermined distance from said first plane.

9. A method according to claim 8, further comprising the steps of:

(4) measuring both a first electrical phase difference and a first distance between two radiating elements positioned on the first plane;

(5) measuring a third electrical phase difference between two of said radiating elements on said first plane and two of said radiating elements on said second plane; and, (6) calculating an azimuth angle and elevation angle of the target based on said first electrical phase difference, said third electrical phase difference, said first distance between said elements positioned on said first plane, and said predetermined distance between said first plane and said second plane.

10. A method according to claim 9, further comprising the step of calculating the azimuth angle for the target using the equation:

$$\phi_{13} = \text{ARCTAN}[(d_{EL}/d_{AZ1})(\delta 1/\delta 3)]$$

where $\phi_{13}$ equals the azimuth angle for the target, $\delta 1$ equals said first electrical phase difference, $\delta 3$ equals said third electrical phase difference, and $d_{AZ1}$ equals said first distance between elements positioned on said first plane, $d_{EL}$ equals said predetermined distance between said first and second plane.

11. A method according to claim 10 further comprising the step of calculating the elevation angle for the target using the equation:

$$\theta_{13} = \text{ARCSIN}[\delta 1/(360(d_{AZ1}/\lambda)\text{SIN}\phi_{13})]$$

where $\theta_{13}$ equals the elevation angle for the target, and $\lambda$ defines to a wavelength of the antenna's operating frequency.

12. A method according to claim 8 further comprising the steps of:

(4) measuring both a second electrical phase difference and a second distance between two radiating elements positioned on the first plane;

(5) measuring a third electrical phase difference between two of said radiating elements on said first plane and two of said radiating elements on said second plane; and, (6) calculating an azimuth angle and elevation angle of the target based on said second electrical phase difference, said third electrical phase difference, said second distance between said elements positioned on said first plane, and said predetermined distance between said first plane and said second plane.

13. A method according to claim 12 further comprising the step of calculating the azimuth angle for the target using the equation:

$$\phi_{23}=ARCTAN[(d_{EL}/d_{AZ2})(\delta 2/\delta 3)]$$

where $\phi_{23}$ equals the azimuth angle for the target, $\delta 2$ equals said second electrical phase difference, $\delta 3$ equals said third electrical phase difference, $d_{AZ2}$ equals said second distance between elements positioned on said first plane, and $d_{EL}$ equals said predetermined distance between said first and second plane.

14. A method according to claim 13 further comprising the step of calculating the elevation angle for the target using the equation:

$$\theta_{23}=ARCSIN[\delta 2/(360(d_{AZ2}/\lambda)SIN\phi_{23})]$$

where $\theta_{23}$ equals the elevation angle for the target, and $\lambda$ defines a wavelength of the antenna's operating frequency.

15. A linear interferometer antenna comprising:

a plurality of radiating elements that receive signals sent from a target, said plurality of radiating elements comprising a first group of radiating elements disposed along a first plane, and a second group of radiating elements disposed along a second plane, said second plane lying parallel to and at a predetermined distance from said first plane;

a beam forming network in communication with said plurality of radiating elements; and, a processing unit in communication with said beam forming network, said processing unit processing said predetermined distance to generate angular measurements relative to the target.

16. The linear interferometer of claim 15, wherein said processing unit generates an azimuth angle measurement of the target.

17. The linear interferometer of claim 15, wherein said processing unit generates an elevation angle measurement of the target.

18. The linear interferometer of claim 15, wherein said plurality of radiating elements comprise six radiating elements.

19. The linear interferometer of claim 15, wherein said beam forming network comprises a switch network, a phase shifter and a power divider.

20. The linear interferometer of claim 15, wherein said beam forming network transmits a plurality of beam patterns in the path of the target.

* * * * *

UNITED STATES PATENT AND TRADEMARK OFFICE
CERTIFICATE OF CORRECTION

PATENT NO. : 5,955,990
DATED : September 21, 1999
INVENTOR(S) : Acoraci et al.

It is certified that error appears in the above-identified patent and that said Letters Patent is hereby corrected as shown below:

Column 2,
Line 20, delete the entire line and replace with
-- Equation 2: $\Phi 2 = ARCSIN[(\lambda/360)(1/d_{AZ2})(1/SIN\theta 2)(\delta 2)]$ --

Column 7,
Line 23, delete the entire line and replace with
-- Equation 3: $\delta 1 = 360(d_{AZ1}/\lambda)SIN\Phi SIN\theta$ --

Signed and Sealed this

Twenty-sixth Day of February, 2002

Attest:

Attesting Officer

JAMES E. ROGAN
Director of the United States Patent and Trademark Office